United States Patent [19]

Oldfield

[11] 3,964,331
[45] June 22, 1976

[54] DAMPER APPARATUS
[75] Inventor: Benjamin Duncan Oldfield, Cheadle Hulme, England
[73] Assignee: Renold Limited, Manchester, England
[22] Filed: June 23, 1975
[21] Appl. No.: 589,528

[30] Foreign Application Priority Data
June 26, 1974 United Kingdom............ 28254/74

[52] U.S. Cl.................. 74/242.1 FP; 74/242.11 S; 74/242.14 R
[51] Int. Cl.²...................... F16H 7/12; F16H 7/10
[58] Field of Search............ 74/242.1 FP, 242.11 S, 74/242.14 R

[56] References Cited
FOREIGN PATENTS OR APPLICATIONS
788,500   1/1958   United Kingdom.......... 74/242.1 FP Primary Examiner—Leonard H. Gerin
Attorney, Agent, or Firm—Flynn & Frishauf

[57] ABSTRACT

Compact damper apparatus for controlling the opposite runs of an endless driving chain passing about a sprocket wheel comprises a pair of oppositely movable spring influenced plungers working in hydraulic fluid filled cylinder bores intercommunicating through a restricted passage. To compact the apparatus, and yet allow it to be mounted with the plungers in an inclined position, the springs are housed in part within the plungers and a single air bleed hole is provided at the highest level inside the hollow interior spring housing part of the uppermost plunger, opening into the plunger/cylinder bore clearance. The proper positioning of this hole allows trapped air which otherwise adversely affects the damping characteristics, to be forced out along the clearance when the apparatus is initially operated, and yet prevents any air being sucked back into the system. An hydraulic fluid reservoir communicates with one of the cylinder bores through a non-return ball valve to ensure that the hydraulic system of the apparatus always remains fully charged.

4 Claims, 5 Drawing Figures

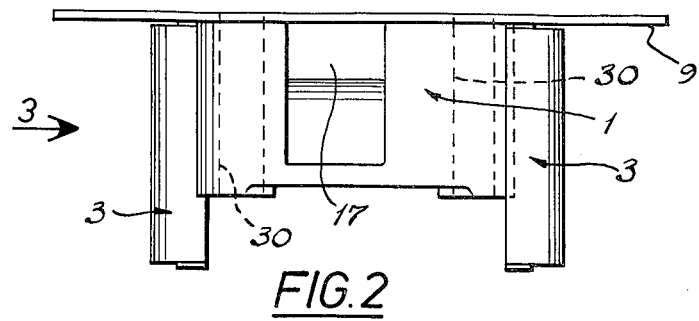
FIG.2
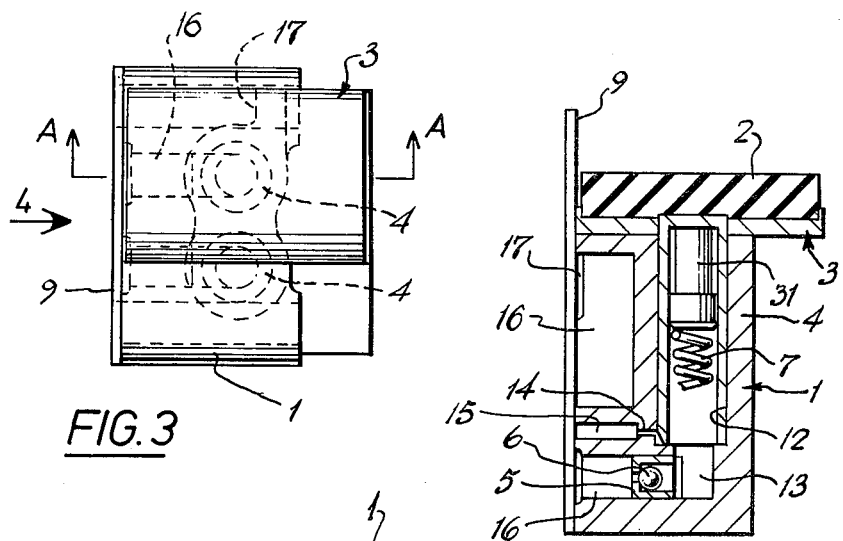
FIG.3
FIG.5
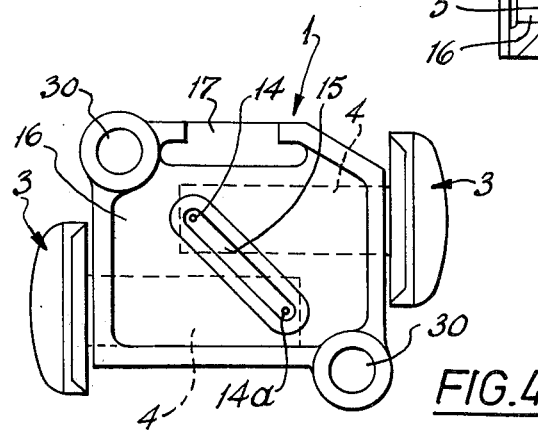
FIG.4

3,964,331

DAMPER APPARATUS

PRIOR APPLICATION:

Priority, Great Britain 26th June, 1974 Application No. 28254/74

This invention relates to damping and concerns damper apparatus comprising a spring influenced plunger movable in a cylinder containing an hydraulic fluid, the plunger extending from the cylinder to an outer end which is required, in use of the apparatus, to apply a force directly or indirectly to a member such, for example, as a drive chain or belt in order to tension it.

A known compact apparatus as just defined employs a hollow plunger having a closed outer end and an open inner end which receives the plunger influencing spring, the spring being partially housed inside the plunger. Hydraulic fluid is supplied into the cylinder and enters the hollow plunger as the plunger applies the required force to the member under the action of the spring, the plunger moving out of the cylinder. The reaction of the member on the plunger is likewise transmitted through the plunger to the spring and deflection of the spring and resulting movement of the plunger back into the cylinder causes hydraulic fluid to flow out of the cylinder. The movement of the plunger in the cylinder is damped by the action of the hydraulic fluid passing into and out of the cylinder. Air trapped inside the hollow plunger, for example during assembly of the apparatus adversely affects the dynamics of this damping action depending directly upon the amount of air which is trapped. Such air is unable to escape if, in use of the apparatus, the cylinder axis is inclined to the horizontal with the inner open end of the plunger lowermost.

SUMMARY OF THE INVENTION

In order to reduce or overcome this problem the present invention proposes to provide a plunger for the apparatus in which (a) the inner open end of the plunger opens into a hollow interior spring housing part of the plunger which extends over part only of the plunger length and (b) an air bleed hole opens from said hollow interior part of the plunger at the highest intended level therein to the outer surface of the plunger, the clearance of the plunger in the cylinder and the position of the bleed hole along the plunger being such that, within the designed stroke of the plunger, there is always sufficient resistance to the passage of air along the cylinder/plunger clearance to prevent air being sucked back therealong and through said bleed hole.

With this construction of apparatus, in accordance with the invention, air trapped in said hollow interior part of the plunger when the cylinder axis is inclined to the horizontal with the inner open end of the plunger lowermost rises to the highest level and all of it may therefore escape through said bleed hole and along the cylinder/plunger clearance when the apparatus is operated. After a few initial operations therefore, utilising the full stroke of the plunger, the apparatus is purged of trapped air and the designed damping characteristics achieved.

Where the member to be tensioned is one run of an endless drive chain or belt having a return run at the opposite side of a sprocket or pulley which is also required to be tensioned on overrun or reversal of the drive the apparatus may further comprise a second, hollow, spring influenced plunger movable in a second cylinder disposed to one side of said first said cylinder and constituting said hydraulic chamber, the second plunger extending from the second cylinder to an outer end through which the tensioning force is to be applied to the return run of the member, the second plunger having a closed outer end and an open inner end which receives the second plunger influencing spring, an hydraulic fluid reservoir, and a non-return ball valve communicating the reservoir with the inner end of one of said cylinders.

Hydraulic fluid is drawn from the reservoir through the non-return ball valve to make up any leakage from the hydraulic fluid system of the apparatus along the cylinder bores to the outside of the apparatus, by the action of one or other of the springs extending its plunger out of its cylinder.

The non-return valve only is required, which operates in a reliable manner to ensure proper operation of the apparatus in allowing its plungers to become extended sufficiently to co-operate with the opposite runs of the member.

Preferably, the reservoir has an open top to the other side of said first said cylinder. This permits the reservoir to be splash fed with hydraulic fluid in appropriate situations.

The invention comprehends the combination of an endless driving chain or belt having opposite runs disposed at opposite sides of a sprocket or pulley, and a compact damper apparatus as defined in the next but one preceding paragraph wherein the damper apparatus is disposed between the runs of said chain or belt with said first said cylinder above the level of said second cylinder, the longitudinal axis of said first said cylinder being inclined to the horizontal and the outer end of said first said plunger being uppermost and said bleed hole opens from the hollow interior part of said first said plunger at the highest level therein.

The foregoing and further features of the present invention will become clear from a consideration of the following description of one specific embodiment of the present invention which is illustrated in the accompanying drawings and which will be described by way of example only and not by way of limitation.

BRIEF DESCRIPTION OF THE DRAWINGS

In the accompanying drawings:

FIG. 2 is a view in the direction of arrow 2 in FIG. 1;

FIG. 3 is a view in the direction of arrow 3 in FIG. 2;

FIG. 4 is a view in the direction of arrow 4 in FIG. 3 with a part removed to show certain interior details of construction of the apparatus, and FIG. 5 is a cross-section on line A—A in FIG. 3.

DETAILED DESCRIPTION OF THE DRAWINGS

Figure 1:
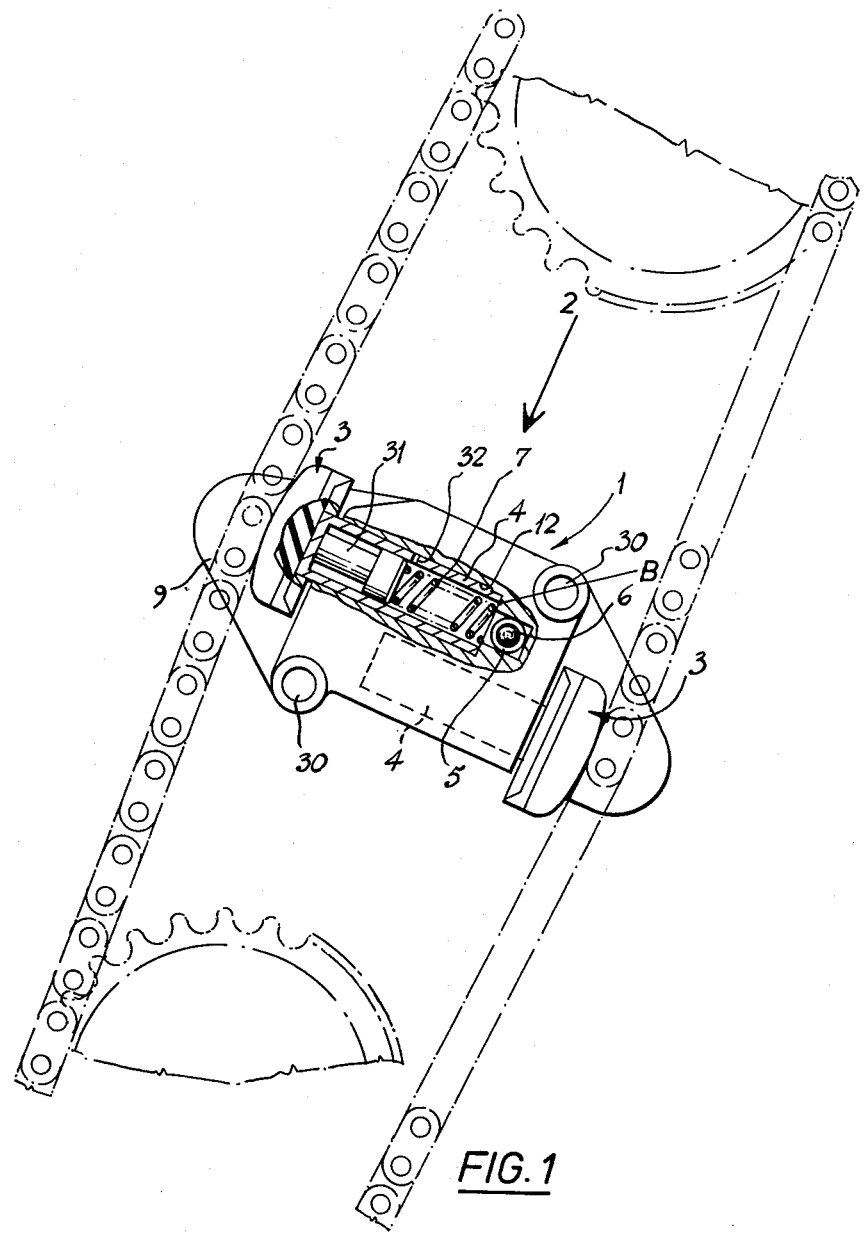
FIG. 1 is a front view, in part in section, of an apparatus in accordance with the present invention in the form of a double acting chain adjuster for an automotive transmission, shown in its intended mounted position.

Referring to the accompanying drawings, the chain adjuster is intended to be mounted between the opposite runs of an endless, automotive main transmission drive chain extending at an angle to the vertical and passing round upper and lower sprocket wheels, generally as illustrated in FIG. 1.

The adjuster comprises a body 1 having parallel, equal diameter bores 12 opening at opposite sides of the body. Two hollow cylindrical plungers 4 having closed outer ends and open inner ends are a close sliding fit one in each bore. The plungers 4 carry identical slipper heads 3 at their outer ends, one to engage each of the chain runs. Each slipper head is composed of a backing plate mounting a conveniently profiled slipper 2 of rubber or nylon. The plungers 4 are urged outwardly in their bores by plunger influencing springs 7. In the intended mounted position of the adjuster, as shown in FIG. 1, the bores 12 are disposed with their axes in the same vertical plane. The upper bore 12 communicates at its inner end with an end chamber 13 shown best in FIG. 5 and formed in the body 1, which chamber 13 opens through a one way ball valve 5,6 into an hydraulic fluid reservoir 16 defined inside the body 1 in part by a removable body back plate 9 which has been removed in FIG. 4. The ball valve 5,6 permits the flow of hydraulic fluid from the reservoir 16 into the chamber 13 but prevents the return flow of hydraulic fluid from the chamber 13 into the reservoir. The upper bore 12 additionally communicates through a restrictor 14 with a channel 15 formed in the body 1 and normally closed on one side by the back plate 9, the channel 15 opening into the lower bore 12 through a corresponding restrictor 14a. Flats, one of which can be seen in FIG. 5, are formed in the plungers so as to prevent the plungers covering over the restrictors 14 and 14a when the plungers are in their innermost position as shown in the drawings. The reservoir 16 communicates at its top with a channel 17 in the top of the body 1. The body is provided with through bores 30 for mounting bolts for mounting the adjuster between the chain runs. It is to be appreciated that although, in the drawings, both of the slipper heads are shown fully retracted, in operation of the adjuster one of them is extended on the end of its plunger away from the adjuster body and contacting the "slack" side of the driving chain. When the driven chain load overruns, this slack side of the chain tightens and the opposite previously tight side of the chain slackens. The extended slipper head is pushed back by the tightening chain at a controlled rate and this extends the other slipper head on its plunger to take up the slack in the opposite side of the chain. The same thing happens when the direction of the drive is reversed. In this manner, the slack side of the driving chain is always controlled during overrun and during following acceleration and the restrictors 14 and 14a also permit sufficient small movement of the slipper head on the chain slack side to allow for normal slight variations in chain tension during running but damp out any excessive movements, provided that the bores 12, the chamber 13 and the channel 15 remain full of hydraulic fluid. Any hydraulic fluid lost by leakage along the cylinder/plunger clearances is drawn in through the ball valve 5,6 from the reservoir 16 which is kept full by splash feed into the channel 17. Thus, as will have been appreciated, the hydraulic fluid in the present example is oil derived from the general engine oil circulation system of the automotive engine, the adjuster being mounted in a position such that it is splash fed with the same oil as is used to lubricate the chain.

The movements of the plungers 12 to extend and retract the slipper heads are oil damped and air trapped inside the adjuster can adversely affect the dynamics of this damping. Air may be trapped inside the adjuster upon assembly of its parts. Such air will normally rise to the highest possible level in the adjuster. If, therefore, the adjuster is mounted with the axes of the cylinder bores 12 horizontal, substantially all air trapped in the adjuster will be forced out along the clearance between the uppermost plunger and its cylinder bore as soon as the adjuster is operated. If the adjuster is to be mounted with the axes of its cylinder bores inclined as shown in FIG. 1 however, air becomes trapped in the hollow interior of the upper plunger 4 in a pocket above the oil, as soon as the oil rises to a level extending from the point B. It is not possible to use a solid plunger, thereby eliminating this pocket, without making the bores 12 sufficiently longer to house the springs 7, and the space available between the chain runs prevents this. As well as air being purged from the adjuster along the upper cylinder bore/plunger clearance it can, if not prevented, re-enter the adjuster back along the same route. The clearance, being very small, is normally filled by an oil film, that is to say, a film of the hydraulic fluid being used in the adjuster. There is a well defined limit to the degree of suction which can be created upon operation of the adjuster tending to suck back air in to the adjuster under any particular operating conditions. The minimum length of oil filled bore clearance of a given size, measured in the direction of the axis of the bore which will prevent suck back is therefore readily found either by calculation or by experiment. The hollow interior of the uppermost plunger 12 is plugged by means of a tightly fitting plug 31 so that the bore of the plunger, in part housing the plunger spring, is effectively shortened. However, a significant portion of the bore is left to house the spring whereby the bore does not have to be lengthened to house a suitable spring or at least lengthened to any great extent. An air bleed hole 32 is then drilled through the plunger wall from its outer surface into its hollow spring housing interior part, on the side of the plug 31 adjacent the inner open end of the plunger but immediately adjacent the plug so that the air bleed hole opens into the hollow interior of the spring housing part of the plunger virtually at its highest level. The distance of the hole 32 from the open end of the bore 12 at the maximum designed extension of its slipper head is determined by the length of the plug 31. This is chosen so that the oil filled clearance between the plunger and its cylinder bore is always sufficiently long to resist air being sucked back along the clearance, through the bleed hole 32 and in to the adjuster. However, the pressure created within the trapped air pocket extending from the point B in FIG. 1 upon operating the adjuster rises significantly above atmospheric pressure and a large part of the trapped air is accordingly forced out of the air bleed hole and along the cylinder/plunger clearance to atmosphere during the first few strokes of the plungers and in this way the adjuster is purged of air.

Only the upper plunger need be provided with a plug 31 and bleed hole 32.

The slipper heads are prevented from rotating by the back plate 9 whereby the hole 32 is maintained in its correct level in relation to the point B.

In the present example, the plunger cylinder bore clearance is in the order of 0.002 inch and the minimum length of oil filled bore clearance to prevent suck back is about 2 mm.

The plug 31 may be replaced by a solid outer end portion of the upper plunger 4.

The plungers 4 instead of carrying slipper heads may act on pivoted slippers in turn engaging the chain runs.

The adjuster as described is equally suitable for endless belt drives.

This invention includes the combination of an endless chain drive and a double acting chain adjuster in which the upper plunger and cylinder of the adjuster are formed to constitute damper apparatus in accordance with this invention as hereinbefore defined and in which the axis of the cylinder is inclined with respect to the horizontal with the inner open end of the plunger lowermost.

It will be appreciated that the 2 mm of oil filled bore clearance applies to the adjuster when the chain drive is at the limit of its wear life. When the chain is new, the length of oil filled bore clearance would need to be substantially greater than this in order to ensure that at maximum wear of the chain, the adjuster would still be properly functionable.

During drive and overrun the plungers will retract and then extend fully. Therefore should there be any suck back of air at maximum extension, the air would be purged immediately on the following retraction.

I claim:

1. Compact damper apparatus for applying a tensioning force directly or indirectly to a member such as a drive chain or belt comprising a first spring influenced plunger movable in a first cylinder which is to contain an hydraulic fluid, the plunger extending from the cylinder to an outer end through which the tensioning force is to be applied to the member, in use of the apparatus, the plunger being hollow and extending from a closed outer end to an open inner end, a first plunger influencing spring which is received in the open inner end of the plunger, an hydraulic fluid chamber, and a restricted passage communicating said hydraulic fluid chamber with said cylinder to provide for flow of hydraulic fluid into and out of said cylinder with movement of said plunger, in use of the apparatus, hydraulic fluid supplied into said cylinder entering the hollow plunger as the plunger applies the required force to the member under the action of the plunger influencing spring, the plunger then moving out of the cylinder, and the reaction of the member on the plunger being likewise transmitted through the plunger to the spring and deflection of the spring, and resulting movement of the plunger back into the cylinder, causing hydraulic fluid to flow out of the cylinder, the plunger having a hollow interior spring housing part which extends over part only of the plunger length and the inner open end of the plunger opening into said hollow interior spring housing part of the plunger, said plunger further having an air bleed hole which opens from said hollow interior part of the plunger at the highest intended level therein to the outer surface of the plunger, the clearance of the plunger in the cylinder and the position of the bleed hole along the plunger being such that, within the designed stroke of the plunger, there is always sufficient resistance to the passage of air along the cylinder/plunger clearance to prevent air being sucked back therealong and through said bleed hole.

2. Compact damper apparatus as claimed in claim 1 wherein the member to be tensioned is one run of an endless drive chain or belt having a return run at the opposite side of a sprocket or pulley which is also required to be tensioned on overrun or reversal of the drive, the apparatus further comprising a second, hollow, spring influenced plunger movable in a second cylinder disposed to one side of said first cylinder and constituting said hydraulic chamber, the second plunger extending from the second cylinder to an outer end through which the tensioning force is to be applied to the return run of the member, the second plunger having a closed outer end and an open inner end, a second plunger influencing spring which is received in the open inner end of the second plunger, an hydraulic fluid reservoir, and a non-return ball valve communicating the reservoir with the inner end of one of said cylinders.

3. Compact damper apparatus as claimed in claim 2 wherein the hydraulic fluid reservoir has an open top disposed to the other side of said first cylinder.

4. In combination: an endless driving chain or belt having opposite runs disposed at opposite sides of a sprocket or pulley; a first slipper head means engaging one run of the chain or belt; a second slipper head means engaging the other run of the chain or belt; and a compact damper apparatus disposed between said opposite runs and engaging same thereby to tension one run of the chain or belt; the damper apparatus comprising: a housing, a first spring influenced plunger movable in a first cylinder bore in the housing and containing an hydraulic fluid, the first plunger extending from the housing to an outer end mounting the first slipper head means, said first plunger being hollow and extending from a closed outer end to an open inner end, a first plunger influencing spring which is received in the open inner end of the first plunger, a second, hollow, spring influenced plunger movable in a second cylinder bore in the housing and containing an hydraulic fluid, said second cylinder bore being disposed to one side of said first cylinder bore, the second plunger extending from the housing to an outer end mounting the second slipper head means, the second plunger having a closed outer end and an open inner end, a second plunger influencing spring which is received in the open end of the second plunger, a restricted passage providing communication for the flow of hydraulic fluid between said first and second cylinder bores, an hydraulic fluid reservoir in said housing, a non-return ball valve communicating the hydraulic fluid reservoir with the inner end of one of said cylinder bores, said first cylinder bore being disposed above the level of said second cylinder bore, the longitudinal axis of said first cylinder bore being inclined to the horizontal, and the outer end of said first plunger being uppermost, the first plunger having a hollow interior spring housing part which extends over part only of the plunger length inner open end of said first plunger opening into the hollow interior spring housing part of the first plunger, and an air bleed hole opening from the hollow interior spring housing part of said first plunger at the highest level therein to the outer surface of said first plunger.

* * * * *